UNITED STATES PATENT OFFICE.

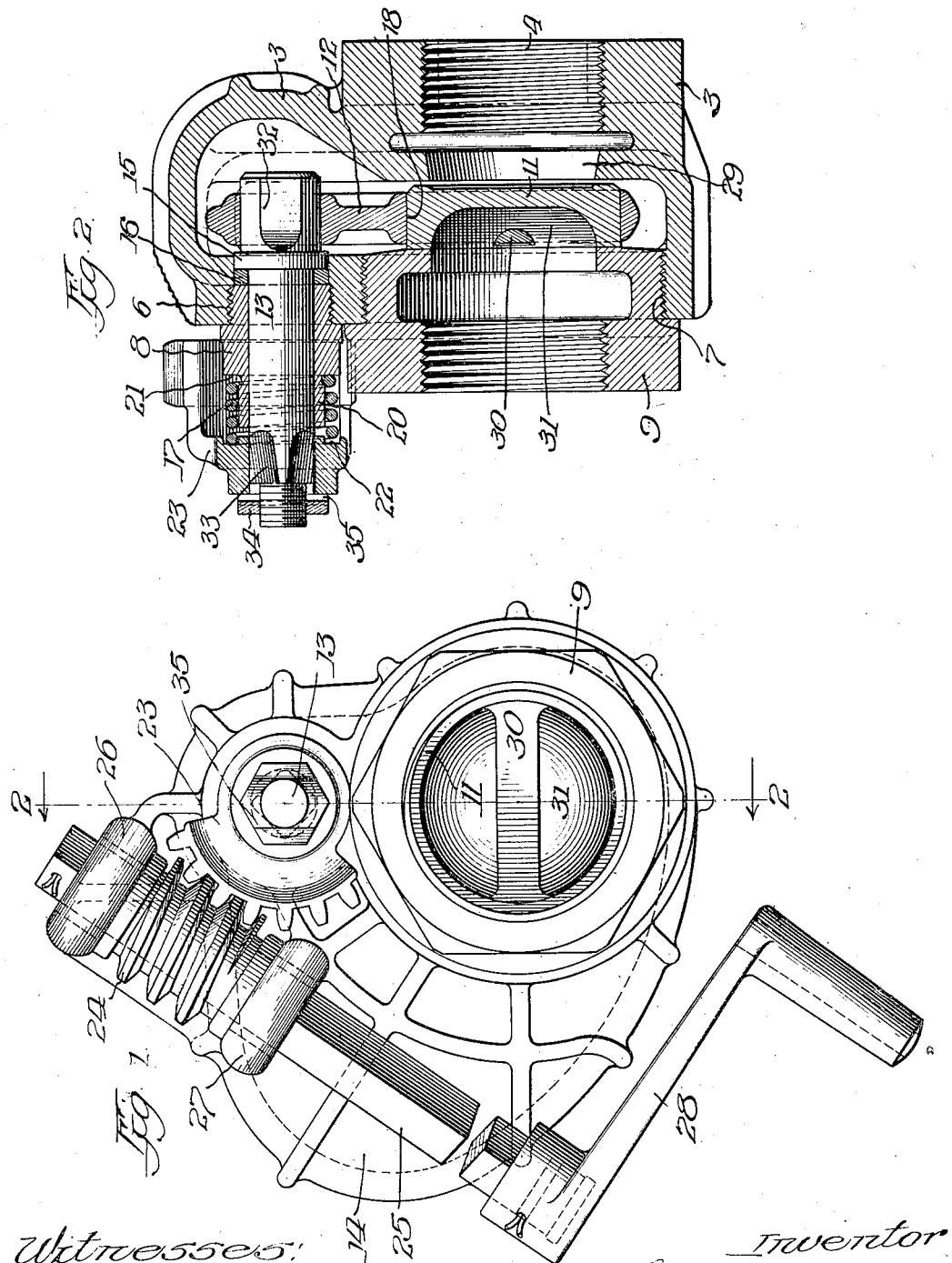

THOMAS W. DEMAREST, OF FORT WAYNE, INDIANA, ASSIGNOR TO THE OKADEE COMPANY, OF CHICAGO, ILLINOIS, A CORPORATION OF ILLINOIS.

VALVE.

1,286,954.   Specification of Letters Patent.   Patented Dec. 10, 1918.

Application filed July 6, 1915. Serial No. 38,341.

*To all whom it may concern:*

Be it known that I, THOMAS W. DEMAREST, a citizen of the United States, and a resident of Fort Wayne, in the county of Allen and State of Indiana, have invented certain new and useful Improvements in Valves, of which the following is a specification.

My present invention relates to valves in general and more particularly valves of the type in which the valve closing member is moved in an arc transversely across the valve seat by means of a member whose axis is parallel to and at one side of the central axis of the valve. Valves of this type are frequently employed as blow-off valves on locomotives.

The principal objects of my invention are the provision of an improved form of construction of straight-way valves; the provision of means for reducing the resistance to flow of fluid through straight-way valves; the provision of improved means for removing the valve closing member for regrinding or other purposes; the provision of improved means for preventing the escape of fluid from the valve; the provision of means for preventing the valve becoming inoperative owing to incrustation on the operating parts; the provision of improved mechanism for operating valves; the provision of means whereby the valve may be readily operated at a distance away from the valve; the provision of means for operating the valve which require a minimum amount of space adjacent the valve, and generally, to improve, simplify and cheapen the construction of valves, particularly those of the straight-way type used as blow-off valves on locomotives.

In attaining these objects and certain other objects and advantages to be hereinafter set forth, I have provided a construction one embodiment of which is illustrated in the accompanaying drawings, in which:—

Figure 1 is an end elevation of the valve and its operating mechanism; and

Fig. 2 is a longitudinal section on the line 2—2 of Fig. 1, looking in the direction of the arrows, the worm and its operating handle and supporting means being omitted.

The form of construction illustrated in the drawings is designed particularly for use as a locomotive blow-off valve. The valve comprises a casing 3 provided with a threaded aperture 4 for the reception of the necessary pipe connecting the valve to the boiler. On the other side the casing is provided with a threaded aperture 7 for the reception of a threaded member 9. The inner face of the member 9 forms the valve seat 10 against which the valve closing member 11 is arranged to seat. A threaded aperture 5 is provided in the member 9 for the reception of the discharge pipe or the like. The member 11 is provided with a substantially cylindrical periphery in order that it may slide axially to and fro in the aperture 18 formed in the member 12 by which it is moved to and fro across the valve seat. This member 12 is non-rotatively, but preferably slidably axially, connected to the pin 13 so that by rotation of the pin 13 the member 12 and the valve closing member 11 carried thereby may be moved in an arc transversely across the valve seat into the side portion 14 of the casing 3 provided for its reception. When the valve closing member has been moved into such side portion there is an unobstructed passage for fluid through the valve.

For decreasing the resistance to the flow of fluid through the valve a conical portion 29 is arranged on the pressure side of the valve so that the stream of steam, or other fluid, as it leaves the inlet half of the casing is given a somewhat contracted form so that the edges of the stream will not contact to any great extent with the edge of the valve seat. This reduces the resistance to flow of fluid as it diminishes the eddying in the space in the valve allowed for the movement of the member 11.

The valve member 11 is arranged to move independently of the pin 13 so that it can be kept in fluid-tight contact with the valve seat by the pressure of the fluid. To enable the member 11 to be removed from the valve independently of the member 12, and consequently of the pin 13, the valve member 11 is preferably arranged so that it can move freely axially to and fro in the aperture 18 of the member 12. Although such movement is not essential to the seating of the member 11 on the valve seat in view of the fact that the member 12 is slidably mounted on the end 32 of the pin 13 which would allow the member 11 to move axially to and from the valve seat independently of the pin 13, such construction materially aids in the automatic adjustment of the parts.

It frequently happens that it is desirable to remove not only the valve seat, but also the member 11 for the purpose of regrinding their contacting surfaces. The member 9 carying the valve seat can be readily removed by unscrewing, but it has frequently happened, however, that considerable trouble was experienced in removing the member 11 from the aperture in the member 12. To remove this difficulty I have provided a recess 31 in the face of the member 11 adjacent the valve seat across which is arranged a bridge 30 formed integrally with the member. This bridge 30 can easily be gripped by the fingers or by a hooked tool in order to pull the member 11 out of the valve.

The pin 13 is mounted in a threaded sleeve 8 screwed into a threaded aperture 6 in the casing 3. Escape of fluid around the pin is prevented by providing a shoulder 15 at its inner end which is normally pressed into fluid-tight engagement with the packing 16 by the pressure of the fluid inside the valve casing.

The shoulder 15 is of such diameter that the pin 13 can be placed in position in the casing through the aperture 6 after which, or simultaneously with which, the sleeve 8 may be screwed into the same aperture. As the pin 13 is introduced through the aperture 6 and the member 12 through the aperture 7, provision is made for sliding engagement between the pin 13 and the member 12. For this purpose two flattened portions are formed on the end 32 of the pin 13, and the apertured member 12 is complementarily formed so that relative rotation cannot take place while the parts can slide axially relatively to each other.

In order to keep the shoulder 15 against its seat when there is no fluid pressure, a spring 17 is provided located externally of the casing.

It has been found that under certain conditions incrustation is liable to form inside the valve, probably owing to drops of water containing salts in solution being carried into the valve casing while steam is being blown off, and being subsequently evaporated when the salts they contained are left behind. If the spring is arranged internally these salts tend to accumulate between the coils thereof so that the spring is prevented from acting properly. The arrangement of the spring externally of the casing has the further advantage that it is not exposed to the heat of the steam in the boiler which, coupled with the continual vibration to which all parts of a locomotive are subjected, is liable to weaken it in course of time.

The spring 17 is preferably arranged, as shown, on a prolongation 20 of the sleeve 8 with one end resting on the shoulder 21 of the same sleeve, and the other end resting in an annular recess 22 formed in the sector 23 by which the pin 13 is rotated.

The sector 23 is preferably recessed as shown in order to provide a compact construction, since by so recessing the sector, not only the toothed portion of the latter, but also the worm 24 in gear therewith can be brought close up against the face of the side portion 14 of the valve casing.

The end 33 of the pin 13, to which the sector 23 is attached, is made in the general form of a cone, and is preferably formed with flats thereon adapted to prevent relative rotation between sector 23 and the pin 13. A grip nut 34 is arranged on the extreme end of the pin 13, which grip nut is formed with a channel 35 on its under side so that the central part of the grip nut can bend and bind the threads on the pin 13. It is important that a tight connection be obtained between the sector 23 and the pin 13 for the reason that the sector 23 has to accurately engage the worm 24, and it is important, therefore, that the sector 23 shall be centered automatically and held in such centered position.

The worm 24 is mounted on a shaft 25 suitably journaled in projections 26 and 27, preferably formed integrally with the valve casing. A handle 28 is provided for rotating the shaft. For convenience the axis of the shaft 25 is arranged substantially perpendicular to the line which joins the two extreme positions of the center of the valve closing member 11.

With the arrangement shown it is obvious that the valve may be located in places where it would be impossible to operate it if the handle was attached directly to the pin 13 owing to the space required by the handle immediately adjacent the valve. By using a worm and sector arrangement the handle can be brought so far from the valve as is necessary to get room to properly operate the handle. Further, the length of the shaft 25 can be increased indefinitely so that the valve can be operated at any distance desired without the use of cumbersome links or the like. The use of a worm and sector gear also provides a closer and more accurate control over the valve mechanism than is possible when the handle is connected directly to the valve operating spindle.

Having thus described my invention and illustrated its use, what I claim as new and desire to secure by Letters Patent is:—

1. A valve comprising, in combination, a valve casing, a valve closing member, a valve operating member passing through the casing into the pressure side of the valve, an enlarged portion on said last-mentioned member adapted to make fluid-tight contact with the valve casing under the pressure of the fluid, and a spring arranged externally of the casing and adapted to act on said last-mentioned member in the same direction as the fluid pressure.

2. A valve comprising, in combination, a valve casing, a valve closing member, a movable valve operating member having slidable and non-rotatable connection with said valve closing member, an enlarged portion on said valve operating member adapted to make fluid-tight contact with the interior of said casing, and a spring externally arranged for holding said valve operating member in fluid-tight contact with said casing.

3. A valve comprising, in combination, a valve casing, a valve closing member, a valve operating member, an enlarged portion on said last-mentioned member adapted to make fluid-tight contact with the interior of the valve casing under the pressure of the fluid, a member adapted to move said last-mentioned member, and a spring arranged externally between the casing and the last-mentioned member.

4. A valve comprising, in combination, a casing, a valve closing member, a member for moving said member, an enlarged portion on said last-mentioned member adapted to make fluid-tight contact with the interior of the casing, and a spring arranged externally between the casing and the last-mentioned member.

5. A valve comprising, in combination, a valve casing, a valve closing member, a valve operating member, an enlarged portion on said last-mentioned member adapted to make fluid-tight contact with the interior of the valve casing, a member adapted to move said last-mentioned member, and a spring arranged externally between the casing and the last-mentioned member.

6. A valve comprising a valve proper, a spindle for operating the valve having a projecting end portion of the general form of a cone, a toothed member for turning said spindle having a central aperture of substantially complementary form, and means for retaining said member in position on said spindle, said toothed member being arranged to overhang the said spindle.

7. A valve comprising, in combination, a valve casing, a valve closing member, a valve operating member projecting through the casing, means on said last-mentioned member adapted to make fluid-tight contact with the interior of the valve casing, and a spring arranged externally of the casing and adapted to act on said last-mentioned member, said last-mentioned member and said valve closing member having their axes in substantially the same direction.

8. A valve comprising, in combination, a valve casing, a valve closing member, a valve operating member projecting through the casing, means on said last-mentioned member adapted to make fluid-tight contact with the interior of the valve casing, and a spring arranged externally of the casing and adapted to act on said last-mentioned member, said last-mentioned member and said valve closing member being movable in substantially the same direction.

9. A valve comprising, in combination, a valve casing, a valve closing member, a valve operating member projecting through the casing, means on said last-mentioned member adapted to make fluid-tight contact with the interior of the valve casing, and a spring arranged externally of the casing and adapted to act on said last-mentioned member, said last mentioned member and said valve closing member having their axes substantially parallel.

In testimony whereof I have hereunto signed my name in the presence of the two subscribing witnesses.

T. W. DEMAREST

Witnesses:
 H. C. RIPPE,
 HARRY VISSERING.